June 11, 1935.  D. C. PRINCE  2,004,767
BATTERY CHARGING SYSTEM
Filed June 8, 1932
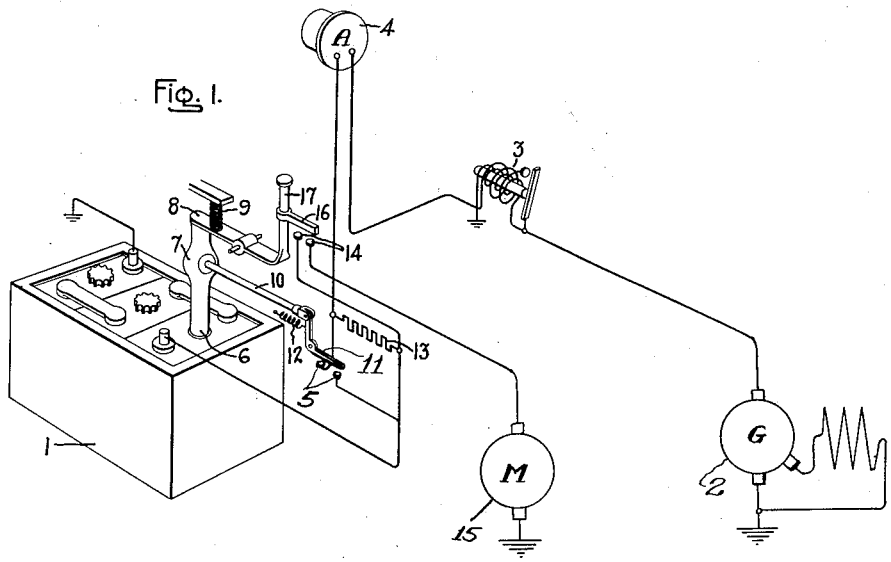
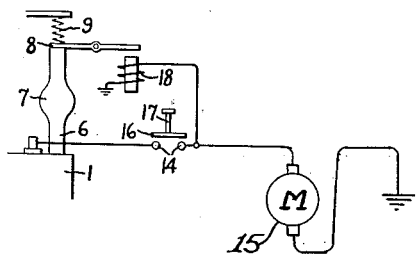
Inventor:
David C. Prince,
by Charles W. Mueller
His Attorney.

Patented June 11, 1935

2,004,767

UNITED STATES PATENT OFFICE 2,004,767

BATTERY CHARGING SYSTEM

David C. Prince, Swarthmore, Pa., assignor to General Electric Company, a corporation of New York Application June 8, 1932, Serial No. 616,051

2 Claims. (Cl. 171—313)

My invention relates to battery charging systems and more particularly to battery charging systems for automobiles.

A great deal of annoyance is caused to drivers of automobiles due to the overcharging of the automobile's lighting and starting battery. The ordinary battery charging equipment for automobiles is arranged to charge at a substantially constant rate which is selected to be suitable for some average condition. As a result, batteries are usually overcharged on runs of any length, which not only shortens their lives but makes it necessary to add water at frequent intervals. Moreover, the gases given off by the battery while it is being overcharged cause considerable deterioration in the parts of the car exposed to them. With the advent of free wheeling, higher charging rates are being generally employed which make this situation even more critical than it has been in the past. On a long straight run the battery may be charged at a high rate for a considerable period of time which will result in its being heavily overcharged inasmuch as the charging rate must be sufficient under ordinary conditions of very intermittent charging which will be met in city driving or driving over irregular terrain.

In accordance with my invention I provide a simple system for preventing overcharging of automobile storage batteries. Broadly speaking, this system combines means responsive to the state of charge of the battery for reducing its charging rate when it reaches a predetermined high state of charge combined with means for restoring the charging rate to its normal value when a relatively heavy load is applied to the battery.

My invention will be better understood from the following description taken in connection with the accompanying drawing and its scope will be pointed out in the appended claims.

In the drawing Fig. 1 illustrates a particular embodiment of my invention while Fig. 2 is a modification thereof.

Referring now to Fig. 1 of the accompanying drawing, 1 is a storage battery which is arranged to be charged by a conventional third brush charging generator 2 through the usual cutout, or reverse current relay 3, and an ammeter 4. Screwed into one of the filler plug holes of the battery 1 is a substitute plug 6 having an extension 7 of some elastic material such as soft rubber. Closing the end of the substitute plug 6 is a valve member, or plate 8, which is urged to its closing position by a spring 9. Mounted adjacent the resilient extension 7 is a rod 10 which is connected by a suitable linkage to a pivoted arm 11 for bridging a pair of switch contacts 5. A spring 12 serves to bias the arm 11 to circuit opening position. A current limiting resistor 13 is connected across the switch contacts 5 so that when these contacts are open the charging current must flow through the resistor 13. Connected to be energized from the battery, through a pair of switch contacts 14, is a motor 15, such as a starting motor for an automobile. Arranged to bridge contacts 14 is a switch arm 16, and associated with valve 8 and arm 16 is a suitable operating lever 17 for causing the operation of both of these devices.

The operation of the arrangement illustrated in Fig. 1 is as follows: During normal operating conditions the parts will be in the position illustrated in the drawing except that the cutout 3 will be closed thereby permitting charging current to flow from the charging generator 2 into the battery through the resistance 13. If the charging continues for a long time the battery will become fully charged when gassing will commence and the gas produced will build up pressure in the substitute plug 6 thereby expanding the resilient extension 7 and causing the rod 10 to move the bridging arm 11 in such a manner as to close contacts 5 and short circuit resistance 13, thereby reducing the battery charging rate. As soon as the automobile is stopped, charging will cease and when the automobile is again started the lever 17 will be depressed in order to complete the circuit from the battery, through the contacts 14, to the starter motor 15. Simultaneously with this operation, the valve 8 will open thereby releasing the compressed gases and causing the arm 11 to again open the contacts 5. As soon as the automobile motor starts the generator 2 will again start charging at the normal rate and this will continue until the amount of energy which was required by the starting motor in restarting the car, and by the lights in case the lights were operated at a time when the charging rate was reduced and also by the ignition during the time that the charging rate was reduced in case the reduction in charging rate was so great that the lights and the ignition apparatus actually cause a drain on the battery. As soon as this energy has been restored to the battery it will again start to gas thereby building up pressure and causing the expansion of the extension 7 thereby closing the contacts 5 and reducing the charging rate.

As will be well understood by those skilled in the art, it is a comparatively simple matter so to design the arrangement that the elastic extensible portion 7 will stand up under the pressure of spring 9 and maintain valve 8 closed at times when the battery is not gassing. A simple way to do this is to utilize a spring which is weak enough not to produce collapse and provide a small enough hole in the plug 6 under valve 8 so that sufficient gas pressure will build up in plug 6 to extend section 7 enough to operate switch 11 before the force produced by the pressure on valve 8 opens it against the force of spring 9. Operation of switch 11 will normally reduce the charging rate to such a low value that further gassing is stopped but even should mild gassing continue the valve 8 will act like a safety valve and the pressure which can build up will be limited by the strength of spring 9.

From the above description it will be seen that I have provided relatively simple and inexpensive means for protecting the battery from serious overcharging and at the same time insuring that it will not become undercharged. An automobile will usually be operated continuously at most for about four or five hours after which it must necessarily stop for fuel and at such times the motor is usually shut off. Consequently, at least every four or five hours on a long trip the battery will have a chance to be replenished in case it is being drained by lights or the ignition apparatus. However, the drain of these devices for such a relatively short period, when the battery itself is fully charged, will not be very serious.

In the modification shown in Fig. 2 the valve 8 is operated electromagnetically instead of mechanically. For this purpose I provide a suitable electromagnet 18 connected in parallel with the starter motor 15. The operation is such that when the starter button 17 is depressed and the battery is connected to the motor 15 it will also be connected to energize the magnet 18 thereby attracting the pivoted valve member and opening the valve against the force of the spring 9.

While I have shown and described particular embodiments of my invention it will be obvious to those skilled in the art that changes and modifications may be made without departing from my invention and I, therefore, aim in the appended claims to cover all such changes and modifications that fall within the true spirit and scope of my invention.

What I claim as new and desire to secure by Letters Patent of the United States, is,—

1. In an automobile, a storage battery, a charging generator connected to charge said battery, a pressure operated switch arranged to reduce the charging rate of said battery when the pressure on said switch produced by gassing of said battery exceeds a predetermined value, a starter motor, a starter switch for connecting said starter motor to said battery, and means operated by said starter switch for releasing the gas pressure on said pressure operated switch.

2. In combination, an electric generator, a storage battery connected to be charged by said generator, means including a pressure responsive circuit controller arranged to be actuated by gassing of said battery for reducing the charging rate of said battery when the pressure produced by gassing of said battery exceeds a predetermined value, a load, and a combined switch and pressure release valve for connecting said load to said battery and at the same time relieving the pressure in said pressure responsive circuit controller.

DAVID C. PRINCE.